United States Patent
Schulzki

(10) Patent No.: US 9,452,665 B2
(45) Date of Patent: Sep. 27, 2016

(54) STOWABLE ROOF ARRANGEMENT IN A MOTOR VEHICLE

(71) Applicant: Dr. Ing. h.c.F. Porsche Aktiengesellschaft, Stuttgart (DE)

(72) Inventor: Markus Schulzki, Ludwigsburg (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 0 days.

(21) Appl. No.: 13/951,577

(22) Filed: Jul. 26, 2013

(65) Prior Publication Data
US 2014/0035311 A1    Feb. 6, 2014

(30) Foreign Application Priority Data
Jul. 31, 2012   (DE) .................. 10 2012 106 973

(51) Int. Cl.
| B60J 7/08 | (2006.01) |
| B60J 7/14 | (2006.01) |
| B60J 7/16 | (2006.01) |
| B60J 7/185 | (2006.01) |
| B60J 7/06 | (2006.01) |
| B60R 21/13 | (2006.01) |
| B60J 7/12 | (2006.01) |

(52) U.S. Cl.
CPC ........ *B60J 7/08* (2013.01); *B60J 7/146* (2013.01); *B60J 10/90* (2016.02); *B60J 7/061* (2013.01); *B60J 7/12* (2013.01); *B60J 7/1692* (2013.01); *B60J 7/1851* (2013.01); *B60R 2021/132* (2013.01)

(58) Field of Classification Search
CPC .......... B60J 7/061; B60J 7/12; B60J 7/1692; B60J 7/1851; B60J 7/08; B60J 7/146; B60R 2021/132
USPC ................ 280/651; 296/107.04, 107.01, 108
See application file for complete search history.

(56) References Cited

U.S. PATENT DOCUMENTS

| 6,666,494 B2 * | 12/2003 | Antreich ................. 296/107.01 |
| 2009/0108623 A1 * | 4/2009 | Haberl ..................... B60J 7/146 296/109 |

FOREIGN PATENT DOCUMENTS

| CN | 101186179 | 5/2008 |
| DE | 10 2005 045 213 | 3/2007 |
| DE | 10 2008 051 754 | 4/2010 |
| EP | 0 845 378 | 6/1998 |

* cited by examiner

*Primary Examiner* — Joseph D Pape
*Assistant Examiner* — Dana Ivey
(74) *Attorney, Agent, or Firm* — Gerald E. Hespos; Michael J. Porco; Matthew T. Hespos

(57) ABSTRACT

A roof arrangement (3) of a motor vehicle is stowable and, in a closed position, extends between an upper windshield cowl and a fixed rollover hoop (6). The roof arrangement (3) has a roof frame (4) which is articulated, via a linkage (11, 13), in a mount (11) that is fixed with respect to a bodyshell. Seals (17) run on both sides of the roof frame (4) and form seal strands in the closed position of the roof arrangement. Each seal (17) is divided into three over its length. A front portion (18) of the seal (17) is fastened to the roof frame (4), a middle portion (19) of the seal (17) is fastened to a link (11) of the linkage (11, 13) and a rear portion (20) of the seal (17) is fastened to a rear surface bow (5).

12 Claims, 2 Drawing Sheets

STOWABLE ROOF ARRANGEMENT IN A MOTOR VEHICLE

CROSS REFERENCE TO RELATED APPLICATION

This application claims priority under 35 USC 119 to German Patent Appl. No. 10 2012 106 973.5 filed on Jul. 31, 2012, the entire disclosure of which is incorporated herein by reference.

BACKGROUND

1. Field of the Invention

The invention relates to a roof arrangement in a motor vehicle.

2. Description of the Related Art

EP 0 845 378 A1 discloses a stowable roof arrangement for a passenger motor vehicle. The passenger vehicle has a fixed rollover hoop that spans a passenger compartment of the vehicle. A stowable roof is articulated on a vehicle body behind the rollover hoop via a linkage. The roof can be moved between closed and stowed positions. In the closed position, the roof is between the rollover hoop and an upper windshield cowl or an upper frame part of a windshield frame. In the stowed position, the roof is arranged behind the rollover hoop. Longitudinally oriented depressions are formed on the top side of the rollover hoop. Links of the linkage rest on the rollover hoop in the region of the depressions when the roof is in the closed position.

Stowable roof arrangements require seals that run on both sides of the roof or of a roof frame to provide reliable sealing with respect to the components of the motor vehicle adjoining the roof or the roof frame. Such components are for example frameless window panes of vehicle doors.

DE 10 2005 045 213 A1 discloses a folding top that has a three-part roof frame each of which has one seal segment. The front seal segment is connected via a seal carrier to a roof front part formed by an areal front bow. The two seal segments situated therebehind are connected to a linkage of the folding top.

DE 10 2008 051 754 A1 describes a three-part roof frame with a correspondingly three-part seal strand. A front seal is connected fixedly to a front roof element. A middle seal is fastened movably to a roof frame of a further roof element. The rear seal is fastened to a roof link.

It is an object of the invention to provide a roof arrangement which, while being of simple structural design, ensures reliable sealing with respect to adjoining components of the motor vehicle.

SUMMARY OF THE INVENTION

The object is achieved in that seals run on both sides of the roof frame. The seals form seal strands in the closed position of the roof arrangement. The respective seal is divided into three over its length. A front portion of the seal is fastened to the roof frame arranged at the front, a middle portion of the seal is fastened to a link of the linkage and a rear portion of the seal is fastened to a rear surface bow.

The surface bow preferably has, laterally adjacent to the middle portion of the seal, a cutout for receiving the linkage during the movement of the roof arrangement. The respective cutout thus serves for the free movement of the top linkage.

The surface bow preferably has, in the region of its rear end, a projection oriented toward the outside. The rear portion of the seal is fastened to the projection.

The linkage of the roof arrangement is in particular designed such that it has a link pair on each side of the motor vehicle. In particular, the respective link pair has a main link and a control link. It is considered to be particularly advantageous for the middle portion of the seal to be fastened to the main link. The main kinematic mechanism of the stowable roof arrangement is of particularly simple configuration if the main link and the control link are pivotably mounted with the respective one end thereof in a top mount and are pivotably mounted with the respective other end thereof in the roof frame.

The main kinematic mechanism is in the form of a four-part linkage, with top mount, main link, control link and roof frame.

The surface bow is connected to the respective link pair via coupling rods arranged on both sides of the motor vehicle.

The roof arrangement is used with a top material which, in the closed position of the roof arrangement, rests on the top side of the roof frame and surface bow. The top material is connected, in partial regions, to the roof frame and to the surface bow, so that, regardless of the covering of the top by means of the top material, the stowage of the roof arrangement by relative movement of the roof frame and surface bow is possible.

Further features of the invention will emerge from the appended drawing and from the description of the preferred exemplary embodiment depicted in the drawing, without the invention being restricted hereto.

DETAILED DESCRIPTION OF THE PREFERRED EMBODIMENTS

The roof arrangement is used in a passenger motor vehicle, in particular in a passenger motor vehicle of two-door configuration with frameless door windows. The passenger motor vehicle is provided with a fixed rollover hoop that is fixed with respect to a body shell and that may be a stamped sheet-metal part. The rollover hoop is lined on its outer side with respect to the vehicle. The passenger motor vehicle has a roof arrangement between the rollover hoop and an upper windshield cowl of the passenger, and thus an upper portion of a windshield frame. The roof arrangement can be moved from a closed position between the upper windshield cowl and the rollover hoop into the stowed position behind the rollover hoop. The roof frame is actuated by a linkage which, with portions of the lining of the rollover hoop being partially moved, rests, in the closed position of the roof frame, on the rollover hoop. In the stowed position of the roof frame, the lining is transferred back into its position in which it closes off the passage for the linkage. The roof arrangement normally has a top. In the closed position, the top material is supported by the roof frame, which bears against the top material from below.

Figure 2:
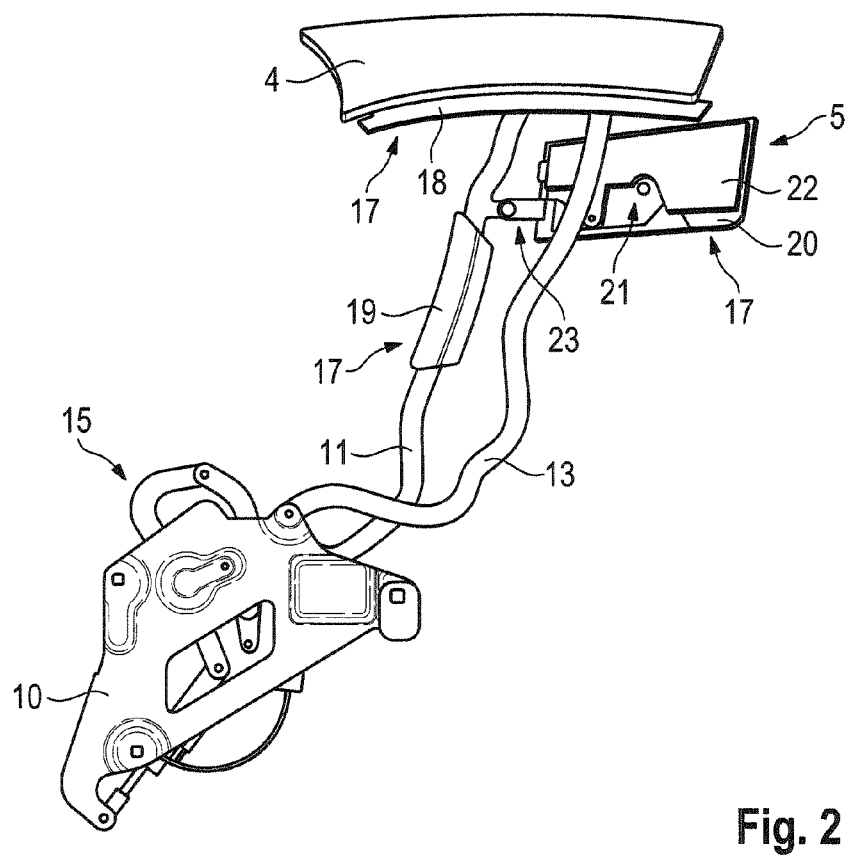
FIG. 2 is a side elevational view similar to FIG. 1, but showing the roof arrangement in an intermediate position between the closed and stowed positions.
Figure 3:
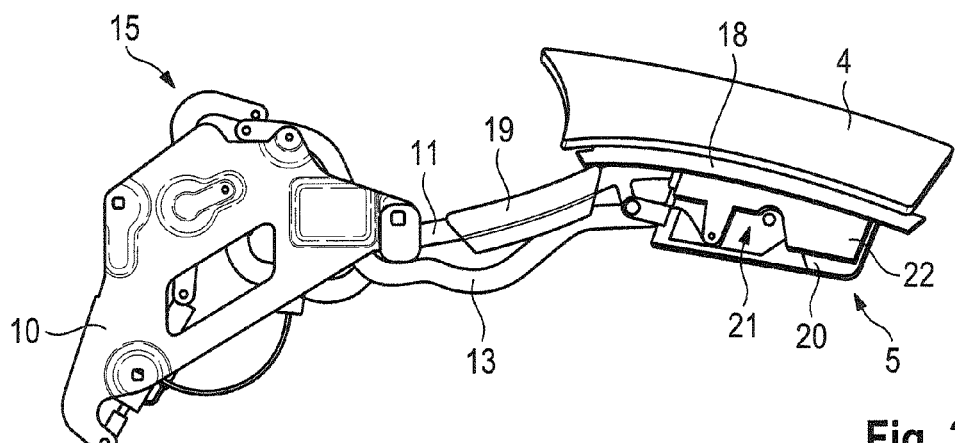
FIG. 3 is a side elevational view similar to FIGS. 1 and 2, but showing the roof arrangement in the stowed position, and accordingly with the top open.

Each side of the passenger motor vehicle has a frameless door window 1, the contour of which when the door window 1 is fully extended out of the body of the door is indicated by the dashed line 2. The passenger compartment of the vehicle is delimited laterally by the two door windows 1 and the closed roof arrangement 3 is positioned above the passenger compartment of the passenger motor vehicle. The roof arrangement has a front roof frame 4 and a rear surface bow 5 directly adjoining the front roof frame. In the closed position, the roof frame 4 extends forward to an upper windshield cowl (not illustrated). The surface bow 5 extends directly to a lined rollover hoop 6. The rollover hoop 6 is a molded part composed of sheet metal and is mounted fixedly in the bodyshell of the vehicle. The outer contour of the rollover hoop 6 is indicated by the dash-dotted line 7. The rear window 8 of the passenger motor vehicle is situated behind the rollover hoop 6, and the upper contour of the rear window 8 is indicated by the double dash-dotted line. The rear window 8 can be pivoted away from the rollover hoop 6 by adjustment means (not illustrated in any more detail), so that the roof arrangement 3 can be transferred from the closed position of FIG. 1 via the intermediate position of FIG. 2 into the stowed position where the top is open, as in FIG. 3.

Each side of the vehicle has a top mount 10 fixed with respect to a bodyshell BS of the vehicle at a position behind and below the rollover hoop 6. A main link 11 is mounted in each top mount 10 in the region of one end, so as to pivot about an axle 12, and a control link 13 is mounted, in the region of one end, so as to be pivotable about an axle 14. A further link arrangement 15 is mounted in the respective top mount 10 and engages the links 11 and 13. The link arrangement 15 can be adjusted by adjustment means (not illustrated) so that the main link 11 and control link 13 can be pivoted in a defined manner relative to the top mount 10. The main link 11 and the control link 13 are mounted pivotably in the roof frame 4 about axles arranged parallel to the axles 12 and 14. The main link 11 is mounted further forward than the control link 13.

The main link 11 and control link 13 on each side of the passenger motor vehicle form a link pair 16. The surface bow 5 is mounted pivotably adjacent to the roof frame 4, in the two link pairs 16 via coupling rods 23. During the transfer of the roof arrangement from the closed position into the stowed position, the surface bow 5 mounted in the link pairs 16 is pivoted under the roof frame 4.

A top material (not shown) is connected in partial regions to the roof frame 4 and to the surface bow 5. In the closed position, the roof frame 4 and the surface bow 5 support the top material by bearing against the top material from below and supporting said top material aerially and over the width of the roof arrangement 3.

Figure 1:
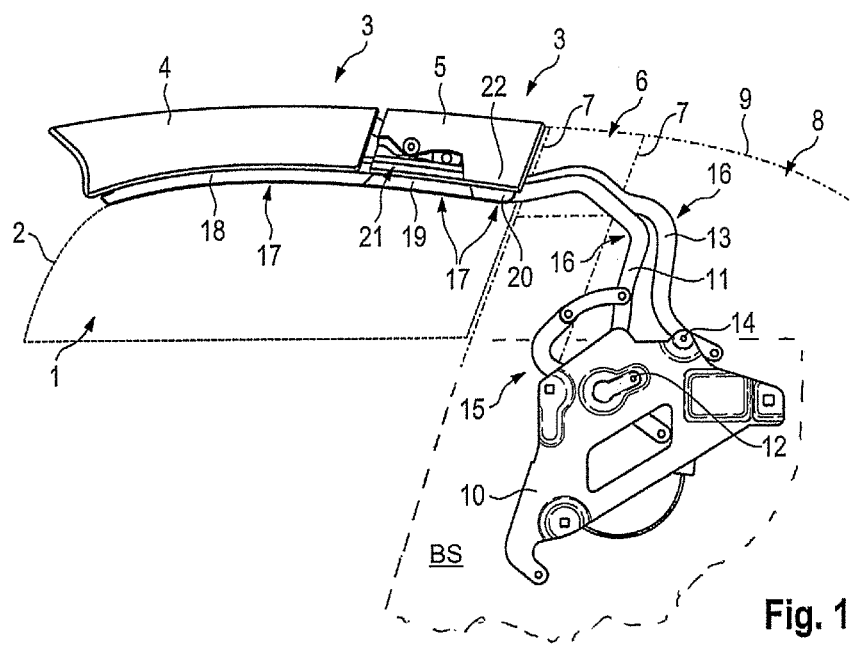
FIG. 1 is a side elevational view of the roof arrangement of the invention in the closed position.

Seals 17 run on both sides of the roof frame 4 and surface bow 5, as shown in FIG. 1, and form sealing strands in the closed position of the roof arrangement 3. Each seal strand is divided into three over its length. A front portion 18 of the seal 17 is fastened to the front roof frame 4, a middle portion 19 of the seal 17 is fastened to the main link 11, and a rear portion 20 of the seal 17 is fastened to the surface bow 5. In the closed position of the roof arrangement 3 shown in FIG. 1, the seal portions 18, 19 and 20 bear sealingly side by side against one another in a row. Thus, the seal 17 interacts on one side with the roof frame 4 and the surface bow 5 and on the other side with the facing contour 2 of the associated door window 1, and provides sealing there.

As can be seen from FIG. 1, each side of the surface bow 5 has a cutout adjacent to the middle portion 19 of the seal 17 for receiving the linkage, specifically the link pair 16 assigned to the side, during movement of the roof arrangement 3. The cutout allows free movement of the main link 11 and control link 13. The rear end of surface bow 5 is drawn out in the direction of the roof frame and bears the rear portion 20 of the seal 17. The rear portion 20 of the seal 17 is fastened to the projection 22 thus formed.

What is claimed is:

1. A roof arrangement of a motor vehicle, the roof arrangement being stowable in an open position and, in a closed position, extends between an upper windshield cowl and a rollover hoop that is fixed with respect to a bodyshell of the vehicle, the roof arrangement comprising:
   a front roof frame;
   a rear surface bow that is rearward of and adjacent to the front roof frame in the closed position and that is forward of and adjacent to the rollover hoop in the closed position;
   a linkage having a main link and a control link on each side of the motor vehicle, each of the main links and the control links having a first end articulated in a mount that is fixed with respect to the bodyshell and a second end that is articulated directly to the front roof frame; and
   seals running on both sides of the roof arrangement, each of the seals being divided to define:
      a front portion fastened to the front roof frame,
      a middle portion rearward of the front portion in the closed position and fastened to the main link of the linkage, and
      a rear portion rearward of the middle portion in the closed position and fastened to the rear surface bow,
      wherein the front, middle and rear portions of each of the seals are arranged end-to-end in the closed position.

2. The roof arrangement of claim 1, wherein the rear surface bow has a cutout laterally adjacent to the middle portion of the seal and disposed for receiving the linkage during movement of the roof arrangement.

3. The roof arrangement of claim 1, further comprising a projection projecting from the rear surface bow and oriented toward the outside, the rear portion of the seal being fastened to the projection.

4. The roof arrangement of claim 1, wherein the linkage has a control link on each side of the motor vehicle.

5. The roof arrangement of claim 4, wherein each of the main link and the control links has a first end pivotably mounted in the mount and a second end pivotably mounted in the front roof frame.

6. The roof arrangement of claim 5, wherein the rear surface bow is connected to the respective main links via link arrangements arranged on both sides of the motor vehicle.

7. The roof arrangement of claim 1, wherein the roof arrangement has a top material which, in the closed position of the roof arrangement, rests on the top side of the roof frame and rear surface bow.

8. The roof arrangement of claim 1, wherein all of the rear portion of the seal is spaced rearward of the middle portion of the seal in the open position of the roof arrangement.

9. The roof arrangement of claim 8, wherein the front portion of the seal has a front end that projects forward of the rear portion of the seal in the open position of the roof arrangement.

10. The roof arrangement of claim 1, wherein the rear portion of the seal has a rear end that abuts the rollover hoop in the closed position.

11. The roof arrangement of claim 1, wherein the rear surface bow is beneath the front roof frame when the roof arrangement is in the open position, the front portion of the seal faces down when the roof arrangement is in the open position, and the rear portion of the seal is on an edge of the rear surface bow that faces down and away from the front roof frame when the roof arrangement is in the open position.

12. The roof arrangement of claim 1, wherein the middle portion of the seal faces down in the closed position and up in the open position.

* * * * *